(12) United States Patent
Dalton et al.

(10) Patent No.: US 7,565,953 B2
(45) Date of Patent: Jul. 28, 2009

(54) BRAKE FORCE TRANSDUCER FOR ELECTRIC BRAKES

(75) Inventors: Kevin M. Dalton, Canton, OH (US); Kurt Burkhalter, Akron, OH (US); Michael P. Osburn, Canton, OH (US); Harold R. Booher, Hartville, OH (US)

(73) Assignee: Meggitt Aircraft Braking Systems, Akron, OH (US)

( * ) Notice: Subject to any disclaimer, the term of this patent is extended or adjusted under 35 U.S.C. 154(b) by 260 days.

(21) Appl. No.: 11/433,020

(22) Filed: May 11, 2006

(65) Prior Publication Data

US 2007/0261926 A1    Nov. 15, 2007

(51) Int. Cl.
*B60T 17/22* (2006.01)
*F16D 51/00* (2006.01)

(52) U.S. Cl. .................. 188/1.11 R; 188/1.11 E; 188/72.8; 188/157

(58) Field of Classification Search ............ 188/1.11 R, 188/1.11 L, 1.11 E, 71.7, 72.8, 73.1, 79.51, 188/156–159, 195
See application file for complete search history.

(56) References Cited

U.S. PATENT DOCUMENTS

| | | | | |
|---|---|---|---|---|
| 3,576,128 A | * | 4/1971 | Lockery | 73/862.622 |
| 4,546,296 A | | 10/1985 | Washbourne et al. | 318/372 |
| 4,784,244 A | * | 11/1988 | Carre et al. | 188/156 |
| 4,953,669 A | * | 9/1990 | Severinsson | 188/171 |
| 6,408,970 B1 | * | 6/2002 | Eng | 180/89.12 |
| 7,364,020 B2 | * | 4/2008 | Ante et al. | 188/1.11 E |
| 2004/0154877 A1 | * | 8/2004 | Severinsson | 188/1.11 E |
| 2005/0140205 A1 | | 6/2005 | Ante et al. | 303/20 |

FOREIGN PATENT DOCUMENTS

EP       0334434 A2  *  9/1989
RU       2117284 C1  *  8/1998

* cited by examiner

*Primary Examiner*—Melody M Burch
(74) *Attorney, Agent, or Firm*—Renner, Kenner, Greive, Bobak, Taylor & Weber

(57) ABSTRACT

An electric brake actuator for the brake system of an aircraft is presented. A brake actuator includes a piston driven by a cylindrical nut and screw arrangement, driven by an appropriate motor of the actuator. Application of brake force results in a reactionary force that deflects the top cover of the actuator. The axial component of this deflection correlates directly with the brake force applied. A beam is interposed between this cover and a top cap, such that deflection of the beam correlates to applied brake face. Piezo-resistive devices are connected to the beam and, through a whetstone bridge, provide an electrical output signal correlating to applied brake force.

13 Claims, 2 Drawing Sheets

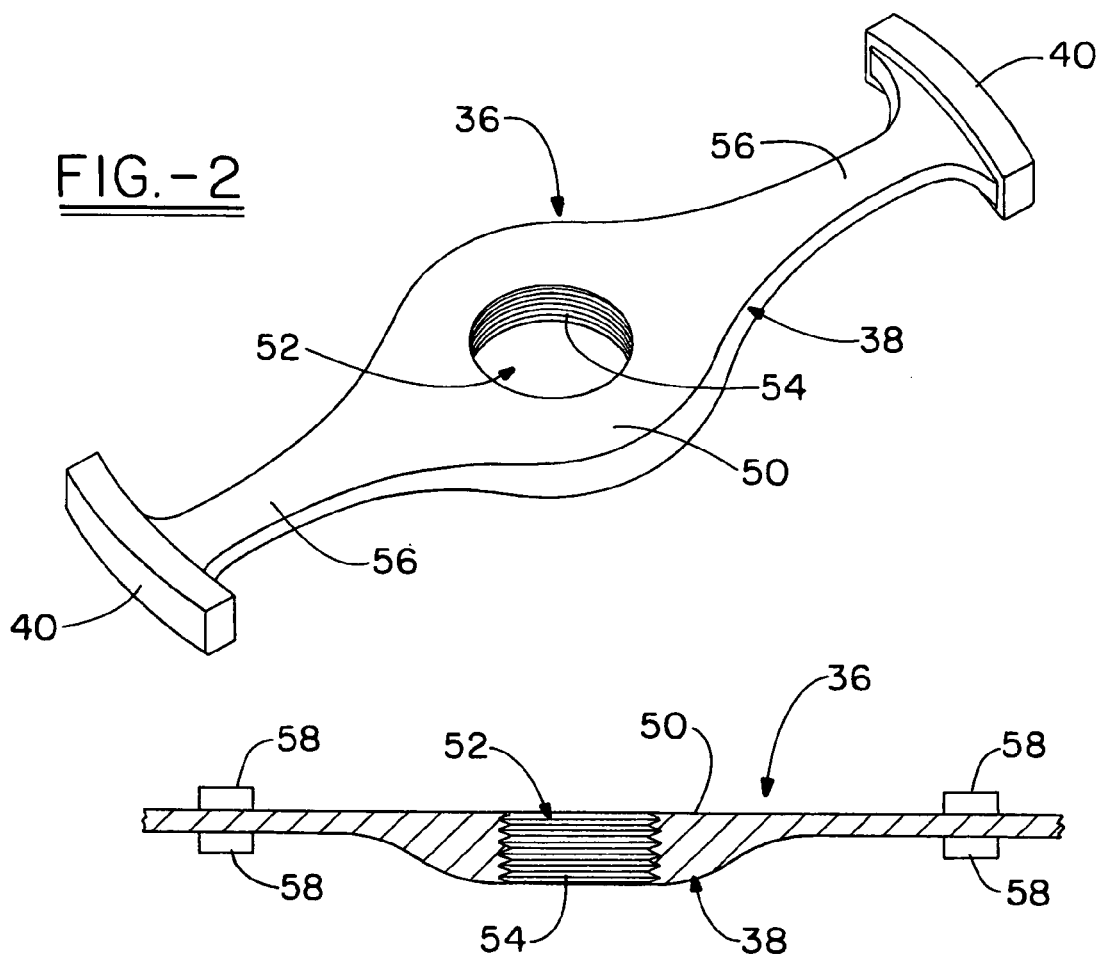
FIG.-2
FIG.-3
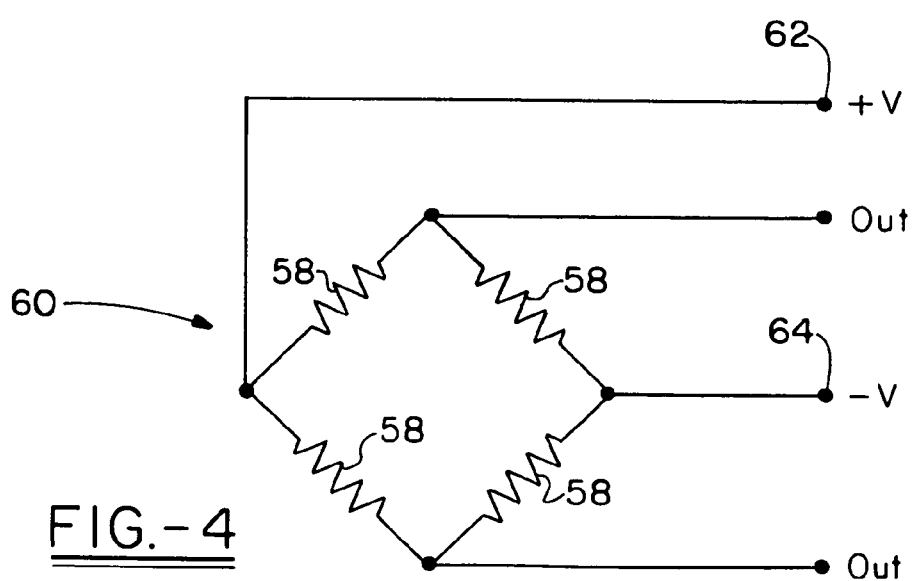
FIG.-4

BRAKE FORCE TRANSDUCER FOR ELECTRIC BRAKES

TECHNICAL FIELD

The invention herein resides in the art of vehicle braking systems and, more particularly, to aircraft braking system. Specifically, the invention relates to electric brake systems for use on aircraft, in which motor driven actuators control the application and release of brake force generated in a brake disc stack. The invention specifically relates to a brake force transducer for use in such electric brake systems.

BACKGROUND ART

The use of electric brakes in aircraft systems has become increasingly popular. In such systems, electric motors are employed to drive a piston through gears, screws and the like, into a pressure plate of a brake disc stack. Typically, there are a plurality of actuators about each brake assembly, generally uniformly distributed thereabout.

Control of electric braking requires that the actuator clamping force be known and adjusted similar to adjusting the pedal pressure for a hydraulic brake. With hydraulics, a change in pressure is proportional to a change in clamping force and the brake control is based on this. No similar, simple relation exists with electric actuation as the input power measured in voltage and current can vary widely with clamping force depending on whether the motor is moving fast or slow, forward or reversing, or under load. When no practical feedback sensor can be integrated into the electric actuator, force estimation methods are employed often based on motor position from a reference point, the assumed stiffness of the brake frame, motor current draw and other factors. These become complex algorithms and at best provide only an estimated force output that can be in relatively large error due to changes in the frame stiffness, twist in the frame during braking, and uneven brake disk wear, to name a few. Therefore, it is highly desirable to have a reliable and independent sensor of motor clamping force as the current invention describes.

In electric brake systems, it is important that the brake force applied by the actuators be controllable and, in that regard, readily monitored. In the past, load cells have been proposed and used. In such systems, the load cells have been placed upon the brake actuator housing or carrier plate. However, various problems incident to this structure have been encountered. Particularly, as the carrier plate and/or housing deform under load, the load cells themselves deform and lose accuracy. Moreover, deflection and deformation of the carrier plate or housing, and consequent deformation of the load cells, adds a non-axial component to the force reading. However, it is known that the effective braking force from an electric brake disc actuator is axial. Accordingly, the load cell in the prior art has been found to read components that are not brake force components, and which either do not result in the generation of brake force, or result in more brake force than what was requested by the controller. This greatly reduces the accuracy of the data obtained from such load cells, since only the axial component of any actuator's force contributes to brake force. As a consequence, accuracy and integrity of the monitoring system is greatly compromised.

DISCLOSURE OF THE INVENTION

In light of the foregoing, it is a first aspect of the invention to provide an electric brake actuator having a force transducer that responds to the axial component of brake force application.

Another aspect of the invention is to provide an electric brake actuator having a force transducer that remains accurate throughout its operation.

Still another aspect of the invention is the provision of an electric brake actuator having a force transducer that provides an output correlated linearly with brake force.

Yet another aspect of the invention is to provide an electric brake actuator having a force transducer that is pre-loaded to assure accuracy throughout its life.

Yet another aspect of the invention is to provide an electric brake actuator having a force transducer that is protected from the elements and the environment.

A further aspect of the invention is to provide an electric brake actuator having a force transducer using piezo-electric devices in a bridge arrangement for reliable and durable use.

Still a further aspect of the invention is to provide an electric brake actuator having a force transducer that is easy to implement with presently existing components and to be employed in presently existing systems.

The foregoing and other aspects of the invention that will become apparent as the detailed description proceeds are achieved by an electric brake actuator, comprising: a motor gear driven screw and nut assembly maintained within a housing; a piston connected to said screw and nut assembly for driven engagement with a pressure plate for a brake disc stack; a top cover secured to said housing for receiving a reactionary force from said screw and nut assembly upon brake actuation; a cap received over said cover; and a force transducer interposed between said top cover and said cap and reacting to said reactionary force to present an electrical output corresponding to a force of brake application.

Other aspects of the invention that will become apparent herein are attained by the improvement in an electric brake actuator having a motor gear driven screw and nut assembly maintained within a housing, a piston connected to said screw and nut assembly for driven engagement with a pressure plate for a brake disc stack, a top cover secured to said housing for receiving a reactionary force from said screw and nut assembly upon brake actuation, and a cap received over said cover, the improvement of a brake force transducer, comprising: an elongated member interposed and restrained between said cap and top cover and responding to said reactionary force to present an electrical output corresponding to a force of brake application.

DESCRIPTION OF DRAWINGS

For a complete understanding of the various aspects of the invention, reference should be made to the following detailed description and accompanying drawings wherein:

FIG. 2 is a perspective view of the force transducer beam employed in the embodiment of FIG. 1;

FIG. 3 is a cross sectional view of the beam of FIG. 2, showing the same with the employed piezo-electric devices; and FIG. 4 is a schematic diagram of the electrical interconnection of the piezo-electric devices of FIG. 3 in a whetstone bridge configuration.

BEST MODE FOR CARRYING OUT THE INVENTION

Figure 1:
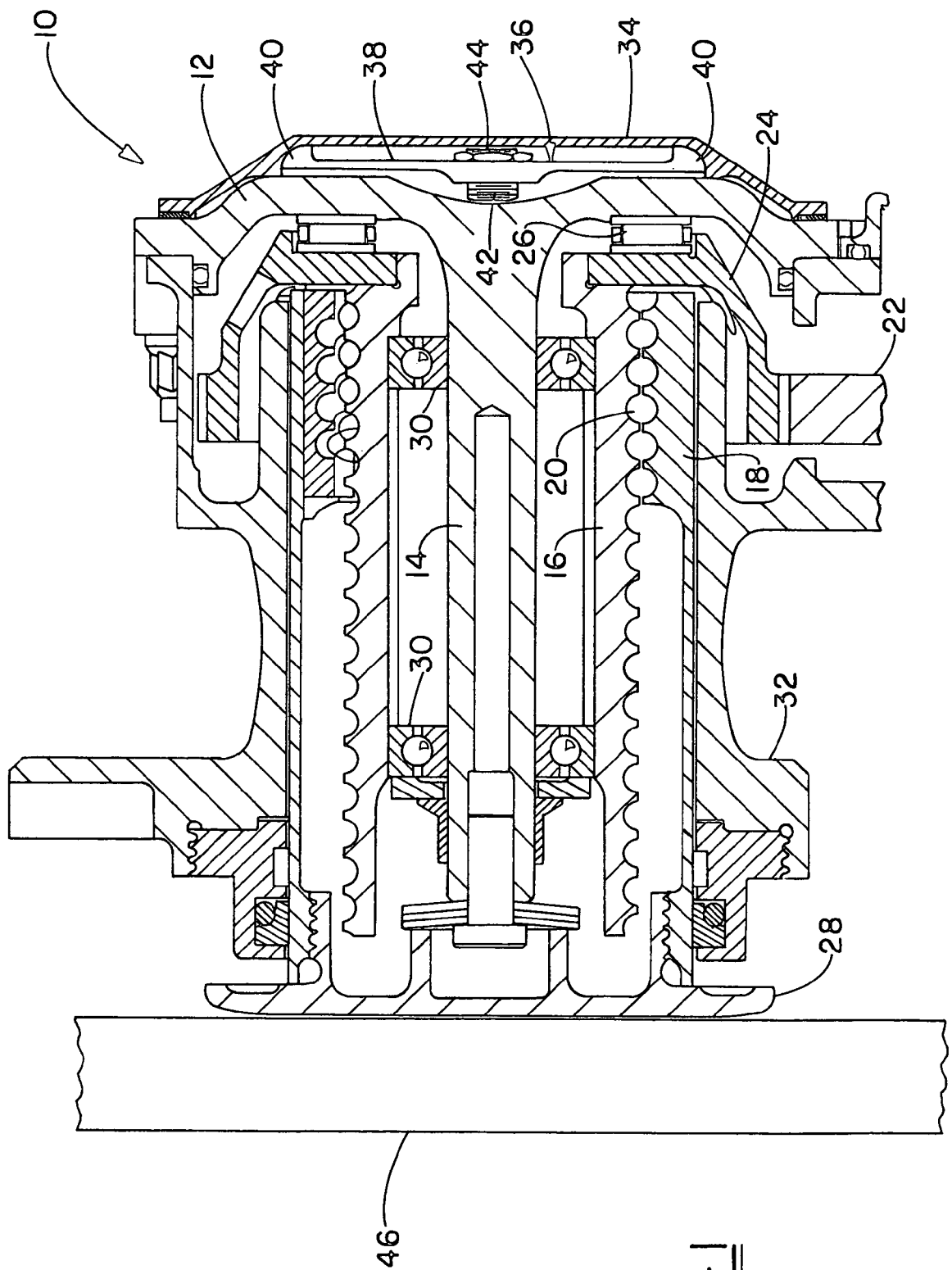
FIG. 1 is a partial cross sectional view of an electric brake actuator employing a force transducer made in accordance with the invention.

Referring now to the drawings and more particularly FIG. 1, it can be seen that a brake piston actuator for an electric brake made in accordance with the invention is designated generally by the numeral 10. It will be appreciated by those skilled in the art that the brake actuator 10 would be associated with an appropriate motor drive, control circuit and gears to drive a piston into and out of engagement with a brake disc stack. In a typical brake assembly, a plurality of such actuators would be mounted to a brake housing assembly circumferentially thereabout, and in alignment with the brake disc stack. The actuator 10 includes a top cover 12 that is integral with a center stem 14, as shown. A cylindrical ball screw 16 is in operative engagement with a cylindrical nut 18, with the screw and nut being drivingly inter-engaged by means of balls received within the spiral paths 20 defined therebetween. As shown in FIG. 1, one half of each of the spiral paths is in each of the cylindrical ball screws 16 and cylindrical nut 18, and together form the paths or channels.

A drive gear 22 is operatively connected to and driven by a motor actuator and serves to drive a gear ring 24 which is drivingly connected to the cylindrical ball screw 16. The ball screw 16 serves to drive the cylindrical nut 18 through the ball drive discussed above.

A flat annular roller bearing 26, with or without a thrust washer, is interposed between the gear ring 24 and top cover 12 as illustrated. A piston insulator 28 is connected to and driven by the cylindrical nut 18 into the pressure plate 46 of an associated brake disc stack. This engagement is effected by a motor (not shown) driving the drive gear 22, which in turn drives the gear ring 24, driving the cylindrical ball screw 16 and, consequently, the cylindrical nut 18. Bearings 30 are interposed about the center stem 14, keeping the cylindrical ball screw 16 in axial alignment therewith. The actuator 10 includes a housing 32, maintaining the operative structure thereof, the housing 32 being mounted to an associated brake housing. A cap 34, serving as an environmental cover protecting the operative structure of the actuator 10 from the environment, is secured to and positioned over the top cover 12.

Those skilled in the art will appreciate that the brake actuator 10 operates such that drive gear 22 drives the gear ring 24 which, in turn, drives the cylindrical ball screw 16 and cylindrical nut 18 to move the piston 28 into the pressure plate 46 of the brake disc stack. A reactionary force to the brake application passes in reverse order through this chain, from the piston insulator 28 to the thrust bearing 26 and then to the top cover 12. In response to this reactionary force, the top cover 12 is deflected. The amount of axial deflection correlates to brake force application. It has been determined in accordance with the invention that monitoring the axial component of the deflection of the top cover 12 constitutes an accurate means for monitoring the brake actuation force of the motor driving the actuator. Accordingly, the deflection of the top cover 12 constitutes an accurate signal source for brake force activity and can be used in a feedback network to control the drive motor of the actuator to control the application and release of brake force.

In accordance with the invention, a brake force transducer 36 is interposed between the cap 34 and the top cover 12. The force transducer 36 may be of any of various geometric configurations, but in the embodiment shown is in the form of a beam 38 that is secured between the top cover 12 and the cap 34. The beam 38 has ends 40 that are urged upwardly into contacting and secure engagement with the cap 34 by means of the upwardly directed force imparted by means of a set screw 42 threadedly received by the beam 38 in axial alignment with the top cover 12 and center stem 14, and urged against the top cover 12. A locknut 44 may be used to secure and lock the position of the set screw 42 to secure and maintain the position of the set screw 42 and, accordingly, the beam 38, to effect and maintain a pre-load of the beam 38. It is also contemplated that a self locking set screw or appropriate locking adhesive may be employed if space does not accommodate a lock nut. Those skilled in the art will appreciate that, as set screw 42 is threaded through the beam 38, the beam 38 is urged upwardly as shown in the drawing of FIG. 1, such that the ends 40 engage the upper portion of the interior of the cap 34 and are precluded thereby from further upward movement, such that further adjustment of the set screw 42 tends to forcefully pre-load the beam 38 in an upward direction. It will be appreciated that an aperture may be provided in the axial center portion of the cap 34 to allow for access to the set screw 42 and locknut 44, or the adjustment of the set screw and locknut 42, 44 can be made prior to the secured engagement of the top cap 34 over the top cover 12, with the pre-loading being effected thereby. This pre-load of the beam 38 is operative to assure accurate readings throughout the life of the unit, and establishes a threshold output signal for a quiescent state where the brakes are not actuated.

With reference now to FIG. 2, an appreciation can be obtained of one embodiment of the force transducer 36. As shown in FIG. 2, the beam 38 includes a center section 50, which is substantially disk shaped, and having legs 56 extending outwardly therefrom. The center section 50 may be thicker than the remainder of the beam 38, to have a central aperture 52, which includes threads 54 for receiving set screw 42. It is also contemplated that the beam 38 may be of uniform thickness, having a boss at the center 50 for receiving the set screw 42. In either event, the legs 56 taper outwardly from the center section 50, as shown. Those skilled in the art will appreciate that this configuration provides an area of significant size upon the legs 56 that is adjacent each side of the center section 50 and that exhibit a large constant strain area, the amplitude of which varies with deflection. It is these areas, offset from the center section 50 toward the respective ends 40, to which appropriate strain or deflection sensing devices are positioned on both the top and bottom of the beam 38 for purposes of monitoring the tension and compression therein as a consequence of the axial deflection of the top cover 12. By tapering the beam 38 in these area, large areas of constant strain at any instant in time are provided. Accordingly, strain gauge location and installation is less problematic, since the working area for installation of the gauge (piezo-electric device) is larger than what it would have been in a non-tapered beam.

As shown in FIG. 3, a partial cross sectional view of the beam of FIG. 2, piezo-resistive elements 58 are secured to aligned top and bottom surfaces of the beam 58 in a section thereof that demonstrates constant strain under deflection. Those skilled in the art will appreciate that such deflection will result in a compression on one side of the beam 38 and a corresponding tension on the other side when such deflection occurs. The tension and compression has been found to be correlated directly to the deflection of the beam 38 and, accordingly, the top cover 12. Since the only force imparted to the beam 38 is axial force through the set screw of 42, which is coaxial with the cover 12 and center stem 14, this force correlates directly to the brake force application. No appreciable radial force components are present, nor are they desired, since such components do not correlate with brake force application.

As shown in FIG. 4, the piezo-resistive elements 58 are connected in an appropriate bridge circuit, such that monitoring of the unbalance of the bridge correlates directly to deflection and, accordingly, brake force application. In the embodiment shown in FIG. 4, a whetstone bridge is employed. Of course, any of numerous bridges or monitoring circuits may be substituted. As shown, a power source 62, 64 is connected across opposing legs or nodes of the bridge 60, with the output, typically in milliamps corresponding to deflection and force application, being monitored across the output terminals connected to the remaining nodes.

While in the preferred embodiment of the invention presented herein, piezo-resistive devices have been employed, the invention contemplates the utilization of various sensors capable of sensing strain or positional change. It will be appreciated that the transducer presented and described herein may employ piezo devices, strain gauges, optical sensors, linear displacement devices and the like.

It should now be apparent that the structure presented above provides for the implementation of a brake force transducer that is operative to sense only the axial component of the reactionary force of a brake piston actuator. In this manner, an accurate reading is obtained of instantaneous brake force application, with this reading being adapted for use in a feedback control system of brake application.

Thus it can be seen that the various aspects of the invention have been attained by the structure presented and described above. While in accordance with the patent statutes only the best mode and preferred embodiment of the invention has been presented and described in detail, it will be understood that the invention is not limited thereto or thereby. Accordingly, for an appreciation of the true scope and breadth of the invention, reference should be made to the following claims.

What is claimed is:

1. An electric brake actuator, comprising:
   a motor gear driven screw and nut assembly maintained within a housing;
   a piston connected to said screw and nut assembly for driven engagement with a pressure plate for a brake disc stack;
   a top cover secured to said housing for receiving a reactionary force from said screw and nut assembly upon brake actuation;
   a cap received over said cover; and
   a force transducer interposed between said top cover and said cap and reacting to said reactionary force to present an electrical output corresponding to a force of brake application, said force transducer comprising an elongated member restrained at an outer portion thereof by said cap and at an inner portion thereof by said top cover, said elongated member receiving a biasing member centrally thereof and coaxial with said screw and assembly, said biasing member comprising a set screw urging said elongated member away from said top cover and toward said cap, said set screw being threadedly received by said elongated member and having an end thereof engaging said top cover coaxially with said screw and nut assembly.

2. The electric brake actuator according to claim 1, wherein said inner portion of restraint of said member is coaxial with said screw and nut assembly.

3. The electric brake actuator according to claim 2, wherein said force transducer is deflectable by said reactionary force applied to said inner portion where said member is restrained by said top cover.

4. The electric brake actuator according to claim 3, wherein said force transducer comprises piezo-electric sensors connected to said elongated member.

5. The electric brake actuator according to claim 4, wherein said piezo-electric sensors respond to movement of said elongated member resulting from and correlating with said reactionary force.

6. The electric brake actuator according to claim 5, wherein said elongated member comprises a beam and said sensors comprise piezo-electric devices on opposite sides of said beam.

7. The electric brake actuator according to claim 6, wherein said beam is of an enlarged mass in a center portion between opposite ends, said piezo-electric devices being positioned between said center portion and said end.

8. The electric brake actuator according to claim 7, wherein said piezo-electric devices are connected to a bridge circuit for monitoring deflection of said beam.

9. The electric brake actuator according to claim 8, wherein said piezo-electric devices comprise piezo-electric resistors.

10. In an electric brake actuator having a motor gear driven screw and nut assembly maintained within a housing, a piston connected to said screw and nut assembly for driven engagement with a pressure plate for a brake disc stack, a top cover secured to said housing for receiving a reactionary force from said screw and nut assembly upon brake actuation, and a cap received over said cover, the improvement of a brake force transducer, comprising:
   an elongated member interposed and restrained between said cap and top cover and responding to said reactionary force to present an electrical output corresponding to a force of brake application; and
   wherein said elongated member is restrained at a center portion thereof by said top cover, said center portion being coaxial with said screw and nut assembly, and a set screw is threadedly received by said center portion, in contact with said top cover, and coaxial with said screw and nut assembly, said set screw biasing said elongated member with a pre-load between said top cover and said cap.

11. The improvement of a brake force transducer according to claim 10, wherein said elongated member is secured at opposite ends thereof to said cap at points equidistant from said center portion.

12. The improvement of a brake force transducer according to claim 11, wherein said elongated member has piezo-resistive devices attached to top and bottom surfaces thereof between said ends and said center portion.

13. The improvement of a brake force transducer according to claim 12, wherein said elongated member comprises a single beam, biased at said center portion away from said top cover and restrained at said ends by said cap.

* * * * *